3,412,160
METHOD FOR THE PRODUCTION OF LOW VOLATILITY ALCOHOLS, ACIDS, ALDEHYDES AND THEIR DERIVATIVES

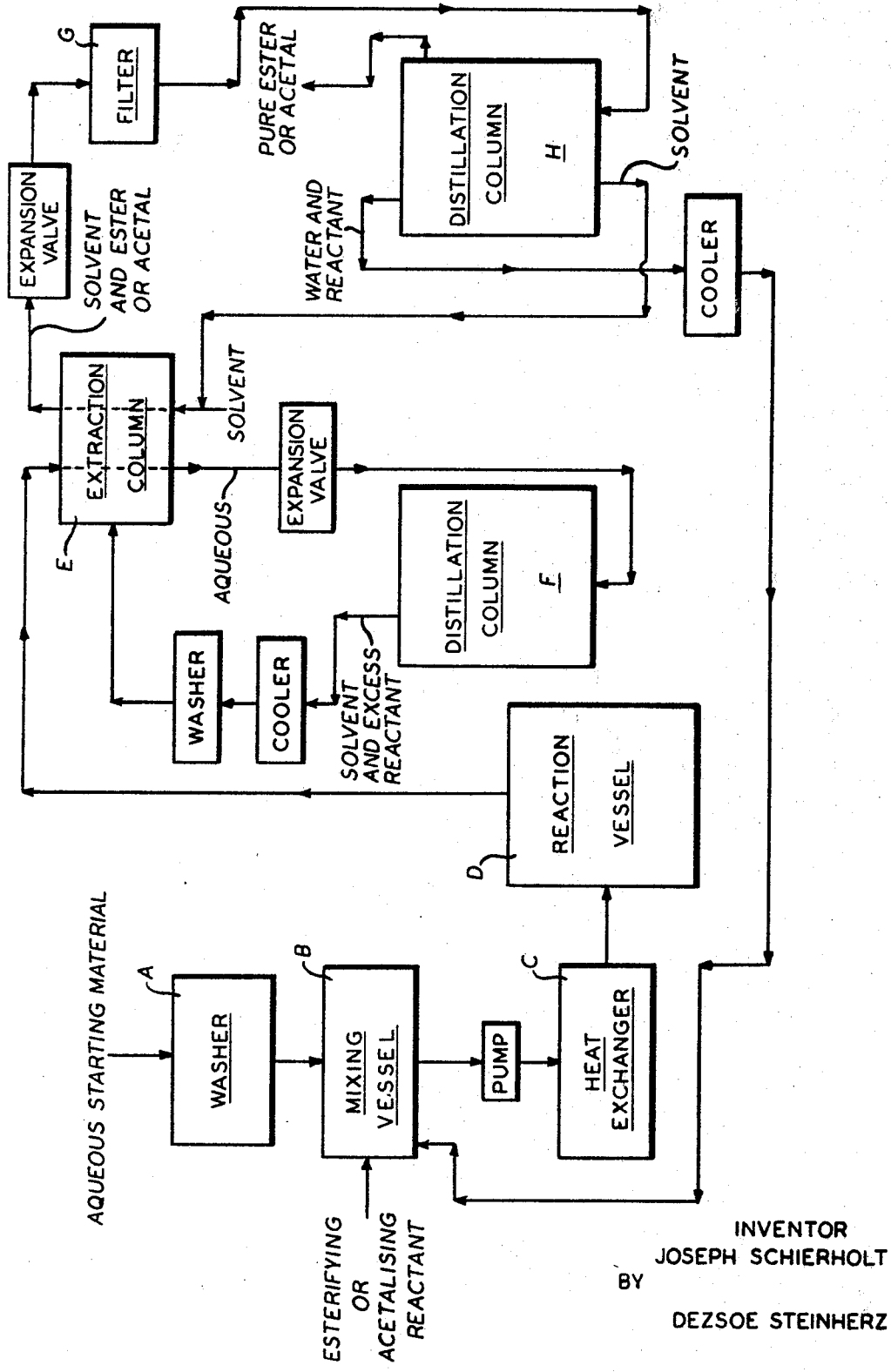

Joseph Schierholt, Spitzwegstrasse 10, Kapellen, near Moers, Germany
Continuation-in-part of application Ser. No. 835,419, Aug. 24, 1959. This application Aug. 7, 1964, Ser. No. 388,246
2 Claims. (Cl. 260—637)

This application is a continuation-in-part of my copending application Ser. No. 835,419, filed Aug. 24, 1959 and now abandoned.

The invention concerns a method for the production from aqueous solutions, of alcohols of low volatility in particular of glycols and multivalent alcohols or their cyclical acetals, of organic acids and their esters, of oxyacids and their cyclical acetal esters, of aldehydes or their derivatives.

The production of glycols and multivalent alcohols from dilute aqueous solutions, such as are obtained, for example, in fermentation processes or by their formation in the course of chemical reactions, requires a large technical outlay and incurs considerable losses. This is caused on the one hand by their low volatility as a result of their high boiling point, and on the other hand by their hygroscopic character or extreme solubility in water. The same applies to the production of the lower aliphatic acids, for example, of acetic acid from very dilute solutions, and for some aldehyde derivatives, for example glyoxylic acids or glyoxal, and for oxyacids as for example lactic acid or glycollic acid. The technical methods used up to now therefore start almost without exception, in the first stage with removal of the water by evaporation, which is then followed by the isolation of the glycol or the multivalent alcohol or of the other substances mentioned. This can be done by a variety of operations, such as distillation with steam under pressure or with superheated steam, distillation with high-boiling hydrocarbons (kerosene), distillation in vacuo and extraction with polar solvents in particular higher alcohols, to mention only a few. Apart from the considerable expenditure of energy required for this, the isolation of the substances mentioned in this way also incurs considerable losses, so that the yields of multivalent alcohols for example, amount to only 80% or less. Many other further difficulties arise, such as incrustation of the apparatus or extraction together with impurities.

Only one method for the production of 2,3-butane diol is known which avoids the above mentioned disadvantages. According to this method, the glycol is converted with formaldehyde into formal and is continuously removed by distillation in the form of its azeotrope, from the equilibrium mixture which forms in acid solution, so that the conversion of the glycol into formal takes place quantitatively. In order to regain the excess aldehyde required for the reaction, and because of the low volatility of the formaldehyde from aqueous solutions, it is necessary to proceed by first converting with methyl alcohol and distilling the methylal formed thereby together with the excess methyl alcohol which on resaponification yields again formaldehyde. Similarly, the saponification of the formal to glycol can for the same reason, only take place through the acetal conversion with methanol. This method however can be applied only to glycols, but not to other multivalent alcohols (glycerine etc.), or to the other compounds mentioned.

The invention relates to a simple method which avoids the disadvantages mentioned during the production of these compounds. It also has the further advantage that it can be applied successfully in the case of very dilute solutions, for which all methods previously described have failed.

According to the invention, the above mentioned substances, which in general are extremely soluble in water and have a low volatility from aqueous solutions, are converted into a derivative (reaction product) of the compound to be obtained, which can readily be split again into its initial components. The distribution of this derivative between water and the chosen solvent is considerably better than is the case with the initial compounds. The conversion is carried out by the addition of a suitable compound (addition compound), particularly in the presence of a catalyst which is in general, of an acid nature. Thus for example, alcohols are converted by the addition of carboxylic acids or aldehydes into respectively ester or acetals, glycols and multivalent alcohols together with aldehyde into cyclical acetals, carboxylic acids with alcohols into ester, oxycarboxylic acids with aldehydes into cyclical acetal ester aldehydes and their derivatives with glycols or alcohols into acetals. The conversions which have been described can be combined together as desired, for example, oxycarboxylic acids can be converted with glycols and alcohols, oxyaldehydes or multivalent alcohols with aldehydes and carboxylic acids to acetal esters. Similarly, conversions with the same addition compound can be carried out repeatedly, for example, erythrite can be converted with acetaldehyde into a diacetal. For this purpose, all compounds with free hydroxyl groups are to be considered as alcohols, and all compounds with two and more hydroxyl groups are to be considered as multivalent alcohols; the same applies respectively for aldehydes and carboxylic acids. According to the invention, the reaction products (acetals, ester, etc.) which even in very dilute solutions and at times only in minute quantities, are formed during the known equilibrium reaction of the ester- and acetal-formation etc., are continuously removed from the equilibrium which continuously readjusts itself. This removal is done by means of a single or repeated extraction with a solvent which is not miscible with water or is miscible only to a limited extent. At the end of the extraction, the compounds to be produced are thus present quantitatively in the solvent phase in the form of their reaction products. The extraction effected in this way, will henceforth be referred to as the reaction extraction. For this, an excess of the added compound can act simultaneously as a solvent, provided that the latter is not at all or not completely miscible with the aqueous solution. The reaction extraction can be undertaken continuously, for example in an extraction column.

Compounds which should be chosen as addition compounds are such as can be regained in a simple way, either by distillation or extraction, so that they can be used again. In some special cases a second reaction extraction may also be considered in order to regain the addition compound. If the addition compound is distilled off it is possible to regain it from the vapours, not only by condensation but also by washing with water. This can be done for instance by directing the vapours of the addition compound in a counter current to the solution to be extracted.

The purification of the reaction products (acetals, ester, etc.) which are present in the solvent at the end of the reaction extraction, is best effected by a single distillation. For example, they can be distilled off directly from the solvent, expediently by means of a distillation column, if a solvent is used for the reaction extraction which has a higher boiling point than the reaction product formed during the process, and which does not form an azeotropic mixture with it. This is the case in the production of 2,3- butanediol. On the other hand, it is also possible to distill off the solvent from the solution—this method of procedure is to be considered in particular, for compounds which form high-boiling reaction products, as for example glycerine, erythrite and others. In such a case, it is expedient to use a low-boiling solvent, and the reaction product remaining in the residue is purified by distillation, if necessary under reduced pressure, or also by crystallization. Finally, by choosing a suitable solvent, which under certain circumstances is added only after completion of the extraction, the reaction products can also be purified by an azeotropic distillation. However, it is also possible if necessary, in combination with one of the above mentioned methods of purification, to isolate the reaction products by means of a second extraction, for example with water or with another solvent which is not miscible with the one already used.

A still further concentration of the reaction product in the solvent phase can be effected by crystallizing out the solvent, which in this case should have a melting point above the temperature of cooling water. For example, pure benzophenone can be crystallized out below 40° C. from the benzophenone solution of the glycerine acetal obtained in the reaction extraction.

Since the reaction extraction itself represents already an extensive purification process, it is often no longer necessary to undertake any of the above mentioned purification processes in order to obtain a product of technical quality.

The methods described above can be used, after a suitable variation, for the production of the class of substances referred to here as reaction products (acetals, ester, acetal ester etc.). For the production of alcohols and the preparation of esters, carbon dioxide and sulphur dioxide can be used as acid components.

The decomposition of the reaction products obtained as described above through the reaction extraction, into the compounds to be produced and the addition compound, is brought about simply by heating with the calculated quantity or with an excess of water, whereby, in the simplest case, the addition compound which was added during the reaction extraction, is simply distilled off. It can however also be extracted from the reaction mixture with a suitable solvent. The regained compound can be used again any number of times for a renewed reaction extraction.

The separation of the addition compound from the compound to be produced, can be facilitated by passing an inert gas through the mixture, for example $CO_2$, which carries the added compound with it. Alternatively, it is also possible to add a second compound, whose boiling point or whose azeotropic mixture with water lies between that of the product to be produced and that of the compound which has been added to the reaction extraction, so that the more easily boiling addition compound can be distilled off in one column from the solution heated to boiling point. The added second compound can be the solvent used for the reaction extraction. For this the addition can be made in such a way, that the previous distillation for the purification is so conducted that a more or less large portion of the solvent remains in the reaction product. Thus for example, in the following mixture, which is converted with sulphuric acid, of 2,3-butanediol-acetaldehyde acetal, xylol and water, by heating the mixture to boiling, the acetaldehyde can be distilled off first, and then the xylol and water, while the glycol remains in the residue. Should a catalyst be required for the decomposition of the reaction product, such a catalyst can be added as an ion exchanger or in the form of a volatile acid, for example formic acid, acetic acid, or if necessary in a mixture with a compound with which it forms an azeotropic mixture, for example a hydrocarbon, which can be separated from the reaction components by distillation. The decomposition can take place continuously, for example in a column.

To regain the initial compound, it is however also possible to dissolve the reaction product in question in a solvent in which the latter is readily soluble, but in which the compound to be produced is soluble only with difficulty, and to separate the compound to be produced by the addition of a suitable compound which has the same functional group as the required compound. For example, glyoxylic acid acetal can be dissolved in benzol which has been saturated with p-toluol sulphonic acid, and the acid forming the basis can be separated by the addition of acetaldehyde.

Examples

It will be appreciated that in the following examples all operations above the temperature of the lowest boiling ingredients of the reaction mixture must be carried out in closed vessels, as otherwise the temperature stated cannot be attained. The pressure in the heated parts amounts to about 2 atmospheres above normal atmospheric pressure in the use of methanol and 4–5 atmospheres above normal atmospheric pressure in the use of acetaldehyde.

Example 1

1.5 kg. of 2,3-butanediol which is dissolved in 50 l. of water, is treated with 5 kg. of acetaldehyde, and after addition of 2 kg. of 45% sulphuric acid and 10 litres of xylol, it is heated to 60° C. for 1 hour, while shaking vigorously. After separation of the two liquid layers, the organic phase is separated. By distillation in a good column, and after the first distillate which contains the acetaldehyde dissolved in the organic phase, 84% of the starting quantity of diol present in the aqueous solution, is obtained as cyclical 2,3-butanediol-acetaldehyde acetal (2,4,5-trimethyl-1,3-dioxolan) B.P. 111–112° C. If the extraction is repeated a further two times with the same quantity of xylol but without further addition of acetaldehyde, 96% of the initially present 2,3-butanediol is produced as cyclical acetal. The acetaldehyde dissolved in the aqueous phase is regained by distillation at a normal or increased pressure.

Example 2

50 litres of 3% butanediol mash, such as is obtained for example in the fermentation of molasses solution with aerobacter aerogenes or pseudomonas hydrophila, is brought to a pH of 3.42 with sulphuric acid. It is then treated with 5 kg. of acetaldehyde and 10 litres of xylol, and heated to 100° for 10 minutes while stirring well. After separation of the two liquids either by standing or centrifuging, the organic phase is separated off, and any solid substances which may still be present in the latter are removed by filtration or centrifuging. This is followed by distillation in a good column. After distillation, in the first distillate, of the excess aldehyde present in the organic phase, the cyclical butanediol-acetaldehyde acetal comes over, and a yield of 68.7% is obtained. By repeating the reaction extraction three times, each with 10 litres of xylol under the same conditions and without any further addition of acetaldehyde, a yield of 94% of acetal is obtained. The excess acetaldehyde present in the remaining aqueous solution can subsequently be regained by distillation.

Example 3

1.5 kg. of 1,3-butanediol, dissolved in 50 litres of water, is treated with 2 litres of a 20% solution of sulphuric acid, 5 kg. of acetaldehyde and 10 litres of methylene chloride, and heated for half an hour to 98° while mixing thoroughly. The organic phase is then separated off, and the solvent with the acetaldehyde dissolved therein, is distilled off. It can be used again without any further treatment. The residue contains 1.6 kg. of 1,3-butanediol acetaldehyde acetal (2,6-dimethyl-1,3-dioxan) B.P. 116–117°. By repeating the process, in this case too the glycol can be obtained quantitatively as acetal, from the aqueous solution. The excess acetaldehyde is again retained from the aqueous solution by distillation.

Example 4

2 kg. of glycerine, dissolved in 20 litres of water, is treated with 0.8 litre of sulphuric acid and 3.5 kg. of acetaldehyde. Without any further addition it is then shaken 18 times at room temperature each time with 5 litres of methylene chloride. The acetaldehyde-containing methylene chloride which is distilled off from the organic phase following the reaction extraction, can be used again for the extraction. The residue of the organic phase obtained during the distillation, consists of 2.4 kg. of glycerine acetaldehyde acetal, corresponding to a 94% extraction of the glycerine.

Example 5

To 100 g. of glycerol dissolved in 1 litre water, together with 200 cm.$^3$ acetaldehyde, 5 cm.$^3$ sulphuric acid of 45% and 250 cm.$^3$ of molten benzophenone are added and the resulting mixture is shaken at 65° for 15 minutes. Subsequently, the solvent phase, which contains 71.5 g. of glycerol acetal is separated, substituted by 250 ccm. fresh benzophenone and shaken again at 65° C. for 15 minutes. Separation of the solvent phase, addition of 250 g. of fresh benzophenone and shaking at 65° C. each time for 15 minutes, are repeated additionally 33 times. The separated portions of the solvent phase are united and cooled slowly to 20° C. Thereby, most of the solvent is obtained in crystallized form and separated by filtration. 500 ccm. of a benzophenone solution of 20% of glycerin-acetal and substantial amounts of acetaldehyde, which are not essential for the further procedure are thus obtained. The solution is then distilled in column having 10 trays. First the acetaldehyde distills, which is separated. Subsequently, glycerin-1,2-acetaldehyde-acetal distills over between 183° and 185° C. Distillation is then interrupted and at the bottom of the column benzophenone is discharged and can be used for further extractions. 12.5 g. of glycerinacetal are thus obtained, which corresponds to a yield of 96% based on the starting material.

Example 6

A solution of 15 g. of erythrite in 500 cm.$^3$ of water is acidified with 20 cm.$^3$ H$_2$SO$_4$ of 45% and mixed with 50 g. of acetaldehyde and 100 ccm. of methylene chloride. The mixture is then shaken at 98° C. for 10 minutes. Subsequently the methylene chloride phase is separated, 100 cm.$^3$ of fresh methylene chloride are added and the resulting mixture is shaken again for 10 minutes. Separation of the solvent phase, addition of 100 cm.$^3$ of fresh methylene chloride and shaking at 98° for 10 minutes in each case, are repeated 8 times additionally. The separated solutions of erythrite-diacetal in methylene-chloride are united and the diacetal is recovered in crystalline form by distilling off the solvent. The yield amounts to 20 g. which corresponds to 96% based on the starting material. By saponification with 10 g. of water and 1 cm.$^3$ of nH$_2$SO$_4$ the erythrite can be regenerated by distilling off the acetaldehyde.

Example 7

A solution of 30 g. of mannite in 1 litre water is shaken 15 times in each case at 100° C. with 100 cm.$^3$ of chloroform for 10 minutes, after mixing said aqueous mannite solution with 50 g. of acetaldehyde and 20 cm.$^3$ H$_2$SO$_4$ of 45%. The united chloroform extracts are freed from chloroform by distillation. The residue consists of 41 g. of mannite-triacetal, corresponding to a yield of 95%.

Example 8

An aqueous solution of acetic acid, prepared from 5 kg. of glacial acetic acid (94%) and 25 litres of water, is acidified with 1 kg. H$_2$SO$_4$ of 45%, and mixed with 10 litres of xylol and 10 kg. of methanol and the mixture is vigorously stirred at 98° C. for 10 minutes. Subsequently, the organic phase is separated, 10 litres of fresh xylol is added and the mixture is shaken at 98° C. for 10 minutes. Separation of the solvent phase and shaking with 10 litres of fresh xylol each time, is repeated twice. The united xylol extracts are distilled through a column having 20 stages. As a head product between 56° and 57° C. with a reflux of 5.6 kg. of acetic acid methylester, is obtained, corresponding to a yield of 97%. Subsequently, the methanol which is in part also extracted, can be distilled off at 64° C. However, separation of xylol and methanol is not absolutely necessary for their renewed use.

Example 9

To a lactic acid solution which contains 4.5 g. of lactic acid in 50 litres of water, 10 kg. of acetaldehyde are added and the mixture is shaken at 98° C. with 10 kg. of o-dichlorobenzene for 30 minutes. Subsequently, the dichlorobenzene phase is separated and shaking with 10 kg. of o-dichlorobenzene each time is repeated 43 times at 98° C. for 30 minutes each time. The separated dichlorobenzene solutions are united and the resulting solution is distilled through a column having 20 stages. In this distillation, "first runnings" containing acetaldehyde and water are obtained and separated. Between 150° and 152° C. the lactic acid ethylidene ester, a cyclic acetalester (2,4-dimethyl-4-oxo-1,3-dioxolan) distills over. The solvent is recovered at the foot of the column. The yield of lactic acid ethylidene ester is 5.1 g. or 96% of the theory.

The following Examples 10–14 illustrate how the process can be carried out continuously. In all processes the same apparatus can be used. Merely the number of stages and the flow of the solvent in the extraction column have to be varied, depending on whether the distribution coefficient is favorable or unfavorable or whether acetal equilibrium or the ester equilibrium is favorable or unfavorable. The number of stages is higher if the distribution coefficient is less favorable (glycerin, lactic acid). If the distribution coefficient is favorable and if the equilibrium condition is unfavorable, it is advisable that, after passing a few stages in the extraction column, the solvent is first introduced into the next to last and the last stage of the extraction column and is introduced only then to the other trays by means of a circulating pump. (Examples 10–12.) In all other cases this is unnecessary and the solvent may flow normally through the extraction column. It will be understood, of course, that the solvent of lower specific gravity is introduced into the extraction column from below, while liquid of higher specific gravity passes through the column in downward direction.

The essential parts of the apparatus for carrying out the esterifying extraction or the actual extraction are as follows:

(A) A washer, which preferably consists of a bubble-tray column having 10 trays. It is supposed to wash out the vapors—which are not condensed in the cooler—of the low-boiling added compounds and thus protects from losses of these compounds.

(B) A mixer for mixing and acidifying the aqueous solutions.

(C) A heat-exchanger for heating the aqueous solutions to reaction temperature.

(D) A reaction vessel which is resistant to pressure and is well heat-insulated. The dimensions of this vessel are selected in such manner, that a stay of 10 minutes of the aqueous solution therein, is assured.

(E) An extraction column. Any conventional extraction column can be used if its dimensions are selected in such manner that the period of flow through it, of the aqueous solution to be extracted, amounts to at least 10 minutes and if it is resistant to pressures occurring at the temperatures applied (2 atmospheres above normal atmospheric pressure in the use of methanol and 4–5 atmospheres above normal atmospheric pressure in the use of acetaldehyde.) The above described specific guiding of the solvent can be easily brought about by built in partition walls which have only one outlet tube for the aqueous phase. The column must be well heat-insulated.

(F) A 5-stage distillation column provided with an efficient cooler for the recovery of esterifying and acetalizing means from the aqueous phase.

(G) A filter for the removal of solid materials which may have been admixed to the solvents.

(H) A distillation column which has 20 stages normally and is heated by indirect heating. In cases, in which the solvent is evaporated, the distillation column can be substituted by a simple evaporating device.

It is, of course, also necessary to have pumps for the transport of solutions and solvents and the intermediate vessels and storage vessels, the use of which is conventional in continuous operations, as well as expansion valves and the tubings. These parts are not particularly mentioned here, because their use is well known and conventional in the art. The rates of flow stated in the following examples are based on a diameter of 150 mm. of the extraction column.

Example 10

400 liters of a 2,3-butanediol-mash of 3%, obtained by fermentation of a molasses solution of 15%, are first passed through the washer. In the latter, the uncondensed vapors of the acetalizing agent or esterifying agent are taken up by the mash so that no losses of these agents occur. From the washer the mash is passed to the mixer, in which the mash is acidified to a pH 3 and is brought by the addition of acetaldehyde to an aldehyde concentration of 10%. If the process is in operation, only the losses of acetaldehyde have to be replaced, which amount to less than 1% if the acetaldehyde recovered by hydrolysis of the acetal is reintroduced into the mixer. From the mixer, the mash which is ready for the reaction, is pumped—over the heat exchanger in which it is heated to 110° C.—to the reaction vessel. In the latter, it has a period of stay of 10 minutes, after which it passes to the extraction column, in which finely distributed xylol flows in opposite direction. Into the extraction column 80 liters of aqueous 2,3-butanediol mash and 16–20 liters of xylol are introduced. In the extraction column the formation of the 2,3-butanediol acetal and the extraction of the acetal, take place simultaneously. After leaving the extraction column, the extracted molasses solution discharged at the bottom of the extraction column is passed through an expansion valve to the distillation column, in which the excess of acetaldehyde and dissolved portions of the solvent are distilled off by means of live steam and return over cooler or washer, quantitative to the solution to be extracted. The xylol flows first through the two lower stages, is passed from there by pipe connection to the second stage from the top, flows through both upper stages in order to adjust the equilibrium and is then pumped back by a pump to the third stage from the bottom, flows through remaining stages and is then drawn off from the head of the fourth stage. Thus the extractions column has in this case 6 stages. From the extraction column, the xylol solution of the acetal, which contains essential amounts of acetaldehyde which have been also extracted, is guided to the distillation column H, after separation of small amounts of solid materials in filter G. This is done again over an expansion valve, because column H operates under normal pressure. The acetal is here separated from accompanying substances i.e. acetaldehyde, small amounts of water and the solvent and is simultaneously purified. From the head the acetaldehyde and the water are drawn off and flow again over a cooler to mixer B or washer A. The acetal is drawn off at a boiling point of 111 to 112° C. from the third tray from the top tray in pure form, while the xylol is drawn off at the foot of the column H and supplied again to the extraction column. In this manner circulation of the solvent is closed. The acetal of the 2,3-butanediol is recovered in this example with a yield of 96%.

Example 11

An aqueous solution of acetic acid containing 50 kg. acetic acid in 500 liters of water, is adjusted in an apparatus described in Example 10, by addition of methanol to a methanol concentration of 20% and is acidified with sulfuric acid to a pH of 0.8. The guiding of the acetic acid solution is the same as in Example 11 with the only difference that instead of acetaldehyde methanol is added. The column E has again 6 stages. Per hour 80 liters of acetic acid solution and 20 liters xylol, heated to 100° C., are supplied to the extraction column. The recovery of excess methanol takes place as in Example 10 over column F and washer A. In a manner similar to that described in Example 10, the xylol is guided first to both lower stages, from there to both of the upper stages and from the 6th stage it is pumped back by means of a pump to the two middle stages. The solvent withdrawn from the head of the 4th stage contains acetic acid methylester in a yield of 97% in solution and also essential amounts of methanol. This solvent is guided over filter G to column H, from which the xylol, after being separated from acetic acid methylester and from methanol, is guided to the extraction column E. From the head of the column H—in this case at a temperature of 57° C.—the acetic acid methylester is drawn off, while the methanol drawn off from the 14th tray, is guided to mixer B. The yield of acetic acid methylester amounts again to 96% of the glacial acetic acid originally present.

Example 12

The apparatus which is used in this example, is the same as that described in Example 10, with the exception that the extraction column has 20 stages. 100 liters of an aqueous solution of pyrrolidonecarboxylic acid are guided through the washer A and adjusted in mixer B to a methanol concentration of 20%. After heating in the heat exchanger to 120° C., the aqueous solution is guided over the reaction vessel—in this case from below—into an extraction column G having 20 stages, into which from the top finely divided diphenyleneoxide (dibenzofurane) flows in countercurrent. 20 liters pyrrolidonecarboxylic acid per hour and 100 liters diphenyleneoxide per hour are supplied to said extraction column. Recovery of excess methanol is carried out in known manner, e.g. as described in Example 11. In this case, the diphenyleneoxide is guided first to the fifth highest tray (from the top) to the second lowest tray from the bottom and then from the lowest tray pumped back to the sixth tray from the top. After flowing through the remaining part of column G, it is drawn off from the third lowest tray and guided to an intermediately arranged evaporator, in which the methanol is distilled off. Subsequently, the diphenyleneoxide is distilled in a 10 stage column H under a vacuum of 100 mm. Between 196 and 200° C. an azeotropic mixture distills over, which contains 18% pyrrolidonecarboxylic acid methyl ester. It is separated from diphenyleneoxide with little water by extraction with little warm water. From this solution—upon cooling—the ester having a boiling point of 180° C. at 20 mm., crystallizes. By hydrolysis with NaOH solution, in known manner glutamic acid is obtained. The ester yield is 95%.

Example 13

An aqueous solution of 10 kg. glycerin in 100 liters of water is adjusted, in the same manner as butanediol in Example 10, is adjusted in mixer B with $H_2SO_4$ to a pH of 3 and by the addition of acetaldehyde to an aldehyde concentration of 20%. The solution is heated in conventional manner to 110° C. and introduced from below into extraction column E, in which from the top finely distributed, molten benzophenone flows in the opposite direction. The extraction column has 20 stages.

Due to the favorable equilibrium condition of the glycerin-acetal formation (under these conditions about ⅔ of the glycerin are present as acetal) the column need not have partition. While recovery of excess acetaldehyde from the aqueous phase drawn off at the head of column G takes place in known manner, the benzophenone solution of glycerinacetal is drawn off at the foot of the extraction column and is supplied, over filter G, to distillation column H. 20 liters aqueous glycerin solution and 80 liters benzophenone per hour are supplied to the extraction column. In distillation column H, at the head, the dissolved acetaldehyde is drawn off and is supplied to the mixer in the manner described in Example 10. From the third tray (counted from the top) in column H at temperatures between 183 and 185° C. the glycerinacetal is drawn off and is obtained with a yield of 96% (based on the starting material). The benzophenone withdrawn from the bottom of distillation column H flows back to extraction column E.

Example 14

100 liters of an aqueous lactic acid solution of 3% are treated in the apparatus described in Example 13 in mixer B by adjusting the solution to a methanol concentration of 15%. After being heated in the heat exchanger C, the mixture flows over the reaction vessel D from below into the extraction column E, into which finely distributed o-dichloro-benzene flows from the top in opposite direction. 20 liters of lactic acid solution and 100 liters of o-dichloro-benzene solution are supplied to the extraction column E per hour. Recovery of the excess methanol from the aqueous phase is carried out as described in Example 11 over column F. The o-dichloro-benzene phase is separated in column H into first runnings of methanol which is drawn off from the head of column F and is supplied to mixer B, the lactic acid methylester which is drawn off from the third highest tray (from the top) at a temperature of 143–145° C. and o-dichloro-benzene which is drawn off at the foot of column H and flows back to the head of extraction column E. The yield of lactic acid methylester is 96%.

Example 15

A solution prepared from 4 kg. of 2,3-butyleneglycol and 10 kg. glycerin, dissolved in 100 liters of water, is adjusted in the mixer B to an aldehyde concentration of 20% and 2,3-butanediolacetal is obtained in the manner described in Example 10. The glycerin acetal is extracted here only to 1.5%, but flows due to its lower volatility in comparison with xylol from the bottom of extraction column H, again into the extracted aqueous phase, so that no losses of glycerin occur. The aqueous phase which contains now only the glycerin, is not supplied to column F, but is adjusted in a second mixer to an aldehyde concentration of 20% by the addition of acetaldehyde. It is then supplied to the lowest stage of a second extraction column E' having 20 stages and in the latter the glycerin is converted and simultaneously extracted in the same manner as the acetal in Example 13. The glycerinacetal is distilled off in a second distillation column H' from the diphenyleneoxide which is used as solvent in this second process. As solvents for the separation of glycerin, in addition to diphenyleneoxide, benzophenone, triphenylphosphate and all-polar solvents can be used which boil about 20° C. higher than the glycerin acetal. 2,3-butanediol-acetal and glycerinacetal are separately obtained with a yield higher than 96% and with high purity.

Example 16

An aqueous solution consisting of 3 kg. 2,3-butanediol, and 3 kg. 1,3-butanediol dissolved in 100 liters water is mixed in the apparatus used in Example 10 and mixed with 25 kg. acetaldehyde, and acidified with $H_2SO_4$ to pH 3, in mixer B. After being heated in the heat exchanger to 110° C., the solution thus prepared flows onto the head of extraction column E, in which finely distributed xylol flows from below in opposite direction. 80 liters of aqueous glycol solution and 20 liters of xylol are pumped onto this column E. The flow of the solvent is the same as in Example 11. From the fourth tray of the extraction column, a xylol solution is drawn off, which contains a mixture of the acetals of the two diols. This mixture is separated in column H into its ingredients and sepaarted from xylol which flows from the bottom of column H to extraction column E. From the head of distillation column H the extracted acetaldehyde is drawn off and supplied in the manner described to mixer B. From the third tray (counted from above) 2,3-butanediolacetal is drawn off at a temperature of 111–112° C. at an about 10-fold reflux, in pure form free from 1,3-butanediolacetal. The 1,3-butanediolacetal is drawn off at a temperature of 116–117° C. from the 12th tray of column H. Both temperatures can be easily observed upon corresponding adjustment of the reflux ratio. The yield of the butanediolacetals amounts in both cases to 96% (based on the weight of starting materials).

Example 17

1 kg. of 2,3 butanediol-acetaldehyde-acetal (2,4,5-trimethyl-1,3-dioxolan) is treated with 10 ccs. of a 45% solution of sulphuric acid and 200 ccs. of water, and it is heated for 9½ hours on a boiling water bath in such a way, that the liberated aldehyde can be distilled off over a column. The latter is again condensed in an effective condenser. The residue is exactly neutralized with soda or sodium hydroxide, and any non-converted acetal as well as excess water is distilled off. The residue consists of 453 g. of 2,3-butanediol, corresponding to a 56.6% conversion. The conversion can be accelerated considerably by passing $CO_2$ into the reaction mixture. The conversion can be carried out quantitatively by converting again the mixture of acetal-water which is distilled off, in a corresponding manner.

Example 18

200 g. of 2,4,5-trimethyl-1,3-dioxolan are heated on a boiling water bath for 2 hours, together with 80 ccs. of water and 10 g. of formic acid, in such a way that the acetaldehyde which is formed can be distilled off over a column. At the end of the reaction, the acetal which has not been converted and water as well as the formic acid which has been added as catalyst, is distilled off. The residue consists of 43.4% of the quantity of 2,3-butanediol corresponding to the acetal. The acetal which has been distilled off can be added renewed to the saponification, so that the conversion takes place almost completely. The saponification of the acetal glycol can also be effected in the following manner: The acetal-water mixture, after adding any losses of acid due to its acting as catalyst, is poured into the middle of a column, at the head of which the liberated acetaldehyde is continuously distilled off, and at the foot of which the glycol is continuously removed.

The apparatus used in the continuous process according to this invention is further illustrated in the appended drawing.

What I claim is:

1. A process for separating soluble higher alcohols from aqueous solutions selected from the group consisting of 2,3 - butanediol, 1,3 - butanediol, glycerine and erythrite by reaction with acetaldehyde to produce an acetal of the group consisting of cyclical 2,3-butanediol-acetaldehyde acetal, 1,3-butanediol acetal, glycerine acetaldehyde acetal and erythrite-acetaldehyde acetal at temperatures between room temperature and 100° C. which is extracted by a substantially water-immiscible solvent selected from the group consisting of xylol, methylene chloride, o-dichlorobenzol, diphenyleneoxide, diphenylmethane, triphenylphosphate, chloroform and benzophenone; allowing the aqueous phase to separate from the water immiscible solvent phase, separating the reaction product from the solvent phases, and splitting it into acetaldehyde and the alcohol to be separated.

2. A process as claimed in claim 1 in which the acetal is formed in the presence of a sulphuric acid catalyst in the aqueous solution.

References Cited

UNITED STATES PATENTS

| 2,785,181 | 3/1957 | Waller et al. | 260—326.3 |
| 2,865,955 | 12/1958 | Ascherl et al. | 260—499 |
| 2,993,055 | 7/1961 | Hennis et al. | 260—340.9 |
| 3,000,904 | 9/1961 | Kundiger et al. | 260—340.7 |

NORMA S. MILESTONE, *Primary Examiner.*